Jan. 24, 1956 G. PRÖPSTL 2,732,286

METHOD OF MAKING PRINTED IMAGES

Filed Sept. 30, 1953

INVENTOR
GEORG PRÖPSTL
BY [signature]
ATTORNEY

United States Patent Office 2,732,286

Patented Jan. 24, 1956

2,732,286

METHOD OF MAKING PRINTED IMAGES

Georg Pröpstl, Zell am Neckar, Wurttemberg, Germany, assignor to Robert Bosch G. m. b. H., Stuttgart, Germany Application September 30, 1953, Serial No. 383,217

8 Claims. (Cl. 41—41)

Figure 1:
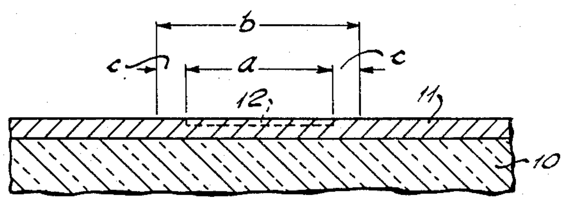

This application is a continuation-in-part of application Serial No. 302,247, filed August 1, 1952, now abandoned.

The present invention relates to a novel method of producing printed images of objects, such as type characters, printing plates or in general any profiled object or surface, more particularly a method involving the production of a latent image upon a registration or copying sheet and subsequent conversion or development of the latent image into a visible image by means of a suitable developing agent.

Among the objects of the invention is the provision of a method of this character which is both simple and easy to use; by which a latent image is produced by simple contact or pressure with an original to be reproduced or copied; which is adapted for either direct reproduction of an original object or for use as a master for producing additional copies by means of known reproduction processes; and which will enable the invisible or latent image to be developed into a visible image or copy expeditiously and by relatively simple means.

With the foregoing and further objects in view, as will become more apparent hereafter, the invention is based essentially on the selective disintegration of an extremely thin metallic layer upon being subjected to a surface pressure by an object or original to be reproduced or printed, whereby to change the rate of reaction of the pressed areas with a disintegrating agent for the metal compared with the non-pressed areas. In other words, the pressed areas of the layer form a latent image which may be converted into a visible image by subjecting the metal to a suitable disintegrating agent, such as an ammonia or bromine atmosphere, during a predetermined time period.

For practical purposes, layers having a thickness of 0.02 to $2\mu$ ($1\mu = \frac{1}{1000}$ of a millimeter) and consisting of finely-divided particles of zinc, cadmium, aluminum, etc., have been found to produce satisfactory results or prints of high quality and resolution. Layers of such minute thickness can be affected or conditioned in their behavior towards a disintegrating agent of the metal by a relatively slight pressure applied thereto by the object or original to be reproduced, whereby to accelerate or decelerate, as the case may be, the rate of reaction of the pressed areas or portions compared with the non-pressed areas, upon subjecting the layer to a suitable disintegrating or developing agent. As a result of this selective disintegration of the pressed and non-pressed areas, respectively, the latent image can be developed into a visible image or print of high contrast and definition by a proper control of the developing time.

In a simple embodiment of the invention, contact of the metallized layer applied to a suitable base, such as a sheet of paper, polystyrene, or the like, with a printing plate or the type characters of a conventional typewriter, under sufficient pressure, effects a change in the structure of the pressed areas to result in a latent image which can be converted into a visible image in the manner pointed out. In applying the pressure to the metallized surface it is advisable to interpose a protective sheet, such as of thin paper or the like, to prevent contaminating matter from being applied to the metal surface and interfering with the latent image formation by pressure application to the layer. In the same manner, fingerprints or prints of other rough or profiled surfaces can be produced by merely pressing the finger against a sheet of metallized paper through a thin sheet of protective paper or the like.

The fact that a relatively slight pressure applied to the metallized layer is sufficient to enable the production of prints or copies of high contrast and resolution, in predicated basically upon the minute thickness and structure of the metallized layer. More particularly, with metallized layers of this type and minute thickness, i. e. with the metal applied in highly dispersed or finely-divided condition, such as obtained by a cathode disintegration or evaporation process in a vacuum, the behavior of the entire layer or metal body is dependent to a predominating degree upon the surface condition of the layer, much more so than in the case of a solid metal body or layer. Moreover, purely geometric reasons play an important part in the formation of a well-defined image or print, as will become evident from the following.

The development or disintegration of the metallized layer, in particular in thet case of a chemical developer, such as a bromine or ammonia atmosphere, constitutes a gradually advancing process, starting at an initial point or development center. For the purpose of the present discussion, it may be assumed that the reaction once started at the surface progresses at approximately equal speed both tangentially as well as transversely to the metallized layer. If the reaction is interrupted at the instant of reaching the opposite or inner side of the layer, it is understood that the developed image differs from the effective latent image merely by an amount equal to or of the order of the thickness of the metallized layer. From this it follows that the developed image or print equals the latent image or object to be reproduced to an increasingly greater degree the smaller the thickness of the metal layer. For this reason layers having a thickness within or below the range mentioned above not only afford the required modification or changes in the structure of the metal by the applied activating pressure, but also result in a developed image or print, upon subjecting the layer to a disintegration process, having a high degree of contrast and definition.

The invention will be better understood by the following detailed description taken in reference to the accompanying drawing forming part of this specification and wherein:

Fig. 1 shows on a greatly enlarged scale a portion of a metallized printing sheet having an elemental latent image formed thereon by pressure from an object or original to be reproduced; and Figs. 2 to 5 show various images obtainable by the development of the latent image of Fig. 1 using different developers and/or metallized layers.

Referring more particularly to Fig. 1, the numeral 10 represents a support or recording sheet consisting, for instance, of lacquered paper, polystyrene or other suitable light-pervious material, and having coated thereon a coherent layer 11 of finely-divided or highly-dispersed metal particles consisting of the group of zinc, cadmium and aluminum, etc. and being preferably produced by a cathode disintegration or evaporation process in a vacuum. The numeral 12 indicates an activated or pressed elemental area upon or within the layer 11, representing a latent image or an object or original to be printed or reproduced. By subjecting the sheet with its latent image to an atmosphere of ammonia or bromine or another developer or disintegrating agent for the metal, the disintegration will be accelerated or decelerated for the pressed area or latent image 12, in such a manner as to result in a copy or print of the original subject matter, provided a proper timing or interruption of the development at the instant when the reaction has progressed from the outer to the inner surface of the layer 11. Such a developed image is shown for example by Fig. 2.

In the foregoing example, the effect of the latent image 12 may be manifested in a slowing down or deceleration of the disintegration at the pressed areas compared with the non-pressed areas, such a pressure activation being more appropriately termed a negative activation or passivation, as compared with a positive activation resulting in an accelerated reaction or disintegration at the pressed areas during development. As an example, when using a metallized zinc layer in connection with bromine vapor as a developer, the activating pressure results in an accelerated disintegration of the metal at the pressed or latent image areas (positive activation), while in the case of an acetic acid atmosphere used as a developing agent for the same metal layer, the applied pressure causes a slowing down of the rate of disintegration of the metal at the pressed areas (passivation or negative activation).

Figure 2:
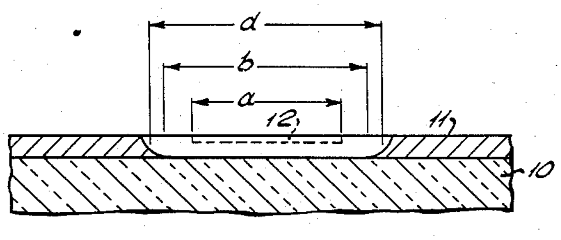
Figure 3:
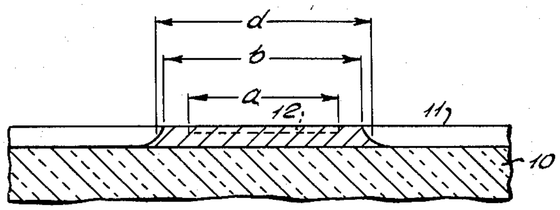
Figure 4:
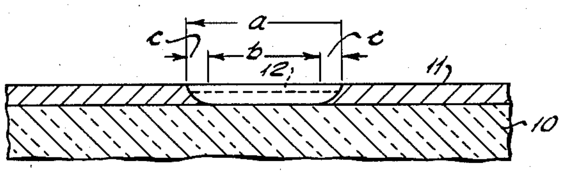
Figure 5:
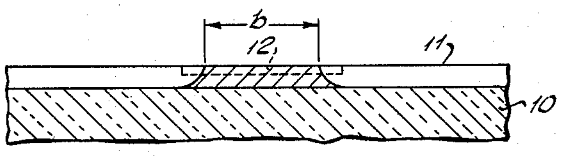

In practice, the effective latent image area *b* may differ from the actual latent image *a*, conforming to the object or original to be reproduced, by a slight amount *c* representing an initial active zone and being either positive, as in Figs. 2 and 3, or negative, as in Figs. 4 and 5, the former having the effect of increasing and the latter of decreasing the effective latent image area *b* compared with the actual latent image *a*. Furthermore, the reaction at the point of transition from the activated to the non-activated areas, for reasons of continuity, changes gradually from zero to a maximum, thus creating additional developing zones beyond the boundaries of the effective latent image. The result will be a final developed image having an area *d* as shown in the drawing.

In the drawing, the additional active area *c* and developing zone have been shown greatly exaggerated for the purpose of better illustration. Both effects are greatly minimized or rendered negligible for all practical purposes by using metallized layers having a thickness within the order given hereinabove.

The difference between the actual and effective latent image or the initial active zone *c* may be due to an interaction between the pressure applying body with the metal, producing additional active zones adjacent to the actually pressed areas, in the case of a positive initial active zone, as shown by Figs. 2 and 3, or causing a partial neutralization of the edge zone of the pressed or activated area, in the case of a negative initial active zone, as shown by Figs. 4 and 5.

Figs. 2 and 3 show the developed image *d* assuming activation or passivation, respectively, of the layer 11 and a positive initial active zone *c*, while Figs. 4 and 5 illustrate the developed image for both activation and passivation, respectively, in case of a negative initial active zone at the start of the developing process.

The pressure activation or passivation of a metallized layer according to the present invention may be effected either by the use of static or dynamic pressure, that is, by simply pressing the body or original to be reproduced upon the layer or by moving a recording element over the layer with sufficient surface pressure (stroke activation).

The minimum pressure required to produce a developable latent image may vary widely, depending upon existing conditions. When using zinc as a metallized coating, pressures of between 0.1 to 10 kg. per $cm.^2$ have been found to give satisfactory results. The optimum pressure for other metals and developer combinations is, however, best determined by experiment.

Although the actual phenomena taking place in formation and development of the latent image are not as yet fully understood, experience and experiments have shown that the following effects or a combination thereof provide a reasonable explanation of the formation and development of the latent image according to the invention.

It may be assumed that the metallized layer is normally covered with a thin covering layer of oxide or another substance, said covering layer being broken up or destroyed by the applied pressure, whereby during the subsequent disintegration the metal is attacked both directly and indirectly so as to result in a selective development or formation of a visible image. The covering layer upon the metallized layer may also be completely torn off and transferred to the pressing body or object at the instant of interrupting the contact, thus again providing areas of different surface conditions and subject to a different rate of attack by the developer or disintegrating agent. Furthermore, it is possible that parts of the metallized layer become recrystallized as a result of the applied pressure or the metallic crystals become crushed or broken up into smaller units by plastic deformation so as to produce starting or developing centers for the subsequent disintegration reaction. Internal stresses and/or faults produced as a result of the applied pressure may also play an important part in producing differently reacting areas forming the latent image as a result of the activating pressure application. In other words, the above and similar effects all cause an inhomogeneity in the pressed portions of the metallized layer compared with the non-pressed portions, in such a manner as to result in a selective preconditioning or varying rate of reaction with the disintegrating or developing agent.

As pointed out hereinbefore, maximum sharpness or definition is obtained by interrupting the development at the instant when the reaction has traversed or progressed to the inner side of the layer, without having materially affected the activated or pressed areas, constituting the latent image, assuming a negative activation or passivation of the pressed areas by the applied pressure. The development may be interrupted by subjecting the layer to a suitable neutralizing or stop bath, while the remaining metallized areas forming the developed image may be protected against further disintegration, such as by the surrounding atmosphere, by the application thereto of a thin chemically neutral coating, such as a coating of polystyrene lacquer or an equivalent material. The print or reproduction obtained in this manner may in turn serve as a master for making further contact prints or enlargements by the aid of any of the known photographic, blueprint, diazo or similar reproduction processes.

Since metals and their reaction products exhibit substantial differences in optical reflectivity and absorption, sufficiently contrasting images or prints can be produced by the method according to the invention by means of metallized layers having a thickness within and below the range mentioned.

The resolution of the developed image is further dependent upon the crystal or grain size of the metal in addition to the thickness of the layer. However, the condition of the base material may also play an important part. For normal reproduction or macroscopic prints, ordinary or lacquered paper has been found to give satisfactory results, while for microscopic registrations or prints, a highly smooth base is required, such as glass, synthetic or equivalent material.

As will be understood, the invention is not limited to the production of photographic, blueprint or like copies using the metallized print as an original, either positive or negative, i. e. with the base of the metallized layer consisting of light pervious, such as translucent or transparent material, and with the metal particles forming a relatively opaque layer. Thus, a metallized image may be produced in accordance with the invention upon a rigid printing plate, coated with a metallized layer in substantially the same manner as described hereinbefore. The plate serves in turn as a matrix for printing a number of copies by the use of a suitable die or pigment selectively adhering to either the metallized or demetallized areas upon said plate. Alternatively, use of a suitable base material makes it possible to selectively etch away the non-metallic or demetallized portions of the plate in an effort to produce a normal printing plate having raised metallized portions. The latter may then in turn be demetallized by subjecting the plate to a disintegrating agent, in order to obtain an ordinary printing plate suitable for use in connection with standard printing applications.

Such a printing plate produced either according to the invention or otherwise may also serve as a means for activating the original metallized area, if a large number of metallized prints or copies are desired. For this purpose, the printing plate or matrix is simply pressed against the metallized layer, preferably with the interposition of a thin protective sheet to prevent the transfer onto the metallized layer of any foreign contaminating substance. The thus obtained pressure activated metallized layer carrying a latent image of the subject matter delineated upon the printing plate is then developed to produce a visible image in the manner according to the invention and described hereinbefore.

A variety of gaseous or liquid materials have been found suitable as disintegrating or developing agents for use in connection with the present invention, a few preferred examples being described in the following. Good results are obtained both with bromine fumes having admixed therewith a suitable ballast gas, such as air or vapors of the solvents of bromine. This developer is especially useful in connection with metallized zinc layers. Other halogen vapors have been found to have a similar effect. Other satisfactory gaseous developers are ammonia-air mixtures containing suitable amounts of moisture, or glacial acetic acid vapor including air and moisture. The foregoing are examples of gaseous developers, while the following are suitable developers in liquid form, tested and found to give satisfactory results: Concentrated sulfuric acid, being especially suitable for dynamic pressure activation of aluminum layers; bromine and other halogens dissolved in various organic solvents, especially suitable for use with zinc, suitable solvents having been found in the form of chloroform, carbon tetrachloride, various ethers, alcohols, benzol, acetone, etc.

In the foregoing the invention has been described with specific reference to a few illustrative methods and processes. It will be evident, however, that modifications and variations, as well as the substitution of equivalent steps and processes for those described herein for illustration, may be made without departing from the broader scope and spirit of the invention as set forth in the appended claims.

In general, the process of the invention may be used for the production of prints, images, records, registrations, etc. of any object, profiled or roughened surface or moving member adapted to exert an activating or passivating pressure, either static or dynamic (stroke activation) upon a metallized surface, including typing, printing, production of fingerprints or prints of any roughened surface to be investigated, recording by a moving pen or stylus, and the like.

The specification and drawing are accordingly to be regarded in an illustrative rather than in a limiting sense.

What is claimed is:

1. A recording method comprising the steps of providing a base member having deposited thereon a coherent layer consisting of highly-dispersed metallic particles and having a thickness of from 0.005 to 2$\mu$, applying to selected areas of said layer conforming to the outline of a record to be produced a pressure to affect the rate of reaction of the layer metal with a disintegrating agent, to thereby form a latent image of said record, and subjecting said layer to a disintegrating agent during a predetermined time period, to cause a differential disintegration at the activated and non-activated areas, respectively, of the layer metal, whereby to convert said latent image into a visible image upon said member.

2. A recording method comprising the steps of providing a base member having deposited thereon a coherent layer consisting of highly-dispersed metallic particles of the group consisting of zinc, cadmium and aluminum and having a thickness of from 0.005 to 2$\mu$, applying to selected areas of said layer conforming to the outline of a record to be produced a pressure to affect the rate of reaction of the layer metal with a disintegrating agent, to thereby form a latent image of said record, and subjecting said layer to a disintegrating agent during a predetermined time period, to cause a differential disintegration at the activated and non-activated areas, respectively, of the layer metal, whereby to convert said latent image into a visable image upon said member.

3. A recording method comprising the steps of providing a base member having deposited thereon a coherent layer consisting of highly-dispersed zinc particles and having a thickness of from 0.005 to 2$\mu$, applying to selected areas of said layer conforming to the outline of a record to be produced a pressure to affect the rate of reaction of the layer metal with a disintegrating agent, to thereby form a latent image of said record, and subjecting said layer to a disintegrating agent of the group consisting of halogen, ammonia and acetic acid vapors during a predetermined time period, to cause a differential disintegration at the activated and non-activated areas, respectively, of the layer metal, whereby to convert said latent image into a visible image upon said member.

4. A recording method comprising the steps of providing a base member having deposited thereon a coherent layer consisting of highly-dispersed metallic aluminum particles having a thickness of from 0.005 to 2$\mu$, applying to selected areas of said layer conforming to the outline of the record to be produced a pressure to affect the rate of reaction of the layer metal with a disintegrating agent, to thereby form a latent image of said record, and subjecting said layer to sulphuric acid during a predetermined time period, to cause a differential disintegration at the activated and non-activated areas, respectively, of the layer metal, whereby to convert said latent image into a visible image upon said member.

5. A recording method comprising the steps of providing a base member having deposited thereon a coherent layer consisting of highly-dispersed metallic zinc particles and having a thickness of from 0.005 to 2$\mu$, applying to selected areas of said layer conforming to the outline of the record to be produced a pressure to affect the rate of reaction of the layer metal with a disintegrating agent, to thereby form a latent image of said record, and subjecting said layer to a disintegrating agent comprising halogen dissolved in an organic solvent during a predetermined time period, to cause a differential disintegration at the activated and non-activated areas, respectively, of the layer metal, whereby to convert said latent image into a visible image upon said member.

6. A recording method comprising providing a base member having deposited thereon a coherent layer consisting of highly-dispersed zinc particles and having a thickness of from 0.005 to 2$\mu$, applying to selected areas of said layer conforming to the outline of a record to be produced a pressure to affect the rate of reaction of the layer metal with a disintegrating agent, to thereby form a latent image of said record, and subjecting said layer to an atmosphere containing bromine during a predetermined time period, to cause a differential disintegration at the activated and non-activated areas, respectively, of the layer metal, whereby to convert said latent image into a visible image upon said member.

7. A recording method comprising the steps of providing a base member having deposited thereon a coherent layer consisting of highly-dispersed zinc particles having a thickness of from 0.005 to 2$\mu$, applying to selected areas of said layer conforming to the outline of a record to be produced a pressure to affect the rate of reaction of the layer metal with a disintegrating agent, to thereby form a latent image of said record, and subjecting said layer to an atmosphere containing ammonia during a predetermined time period, to cause a differential disintegration at the activated and non-activated areas, respectively, of the layer metal, whereby to convert said latent image into a visible image upon said member.

8. A recording method comprising the steps of providing a light-pervious base member having deposited thereon a coherent layer consisting of highly-dispersed metallic particles having a thickness of from 0.005 to 2$\mu$, applying to selected areas of said layer conforming to the outline of a record to be produced a pressure to affect the rate of reaction of the layer metal with a disintegrating agent, to thereby form a latent image of said record, and subjecting said layer to a disintegrating agent of the layer metal during a limited time period, to cause a differential disintegration at the activated and non-activated areas, respectively, of the layer metal such as to substantially remove the metal at one of said last-mentioned areas, whereby to convert said latent image into a visible image upon said member.

References Cited in the file of this patent

UNITED STATES PATENTS

| | | |
|---|---|---|
| 2,600,343 | Tuttle | June 10, 1952 |
| 2,626,206 | Adler et al. | June 20, 1953 |

FOREIGN PATENTS

| | | |
|---|---|---|
| 593,014 | Great Britain | Oct. 6, 1947 |